April 12, 1932.  C. F. SHADLE  1,853,236
METHOD OF CONDITIONING AIR
Filed April 1, 1930
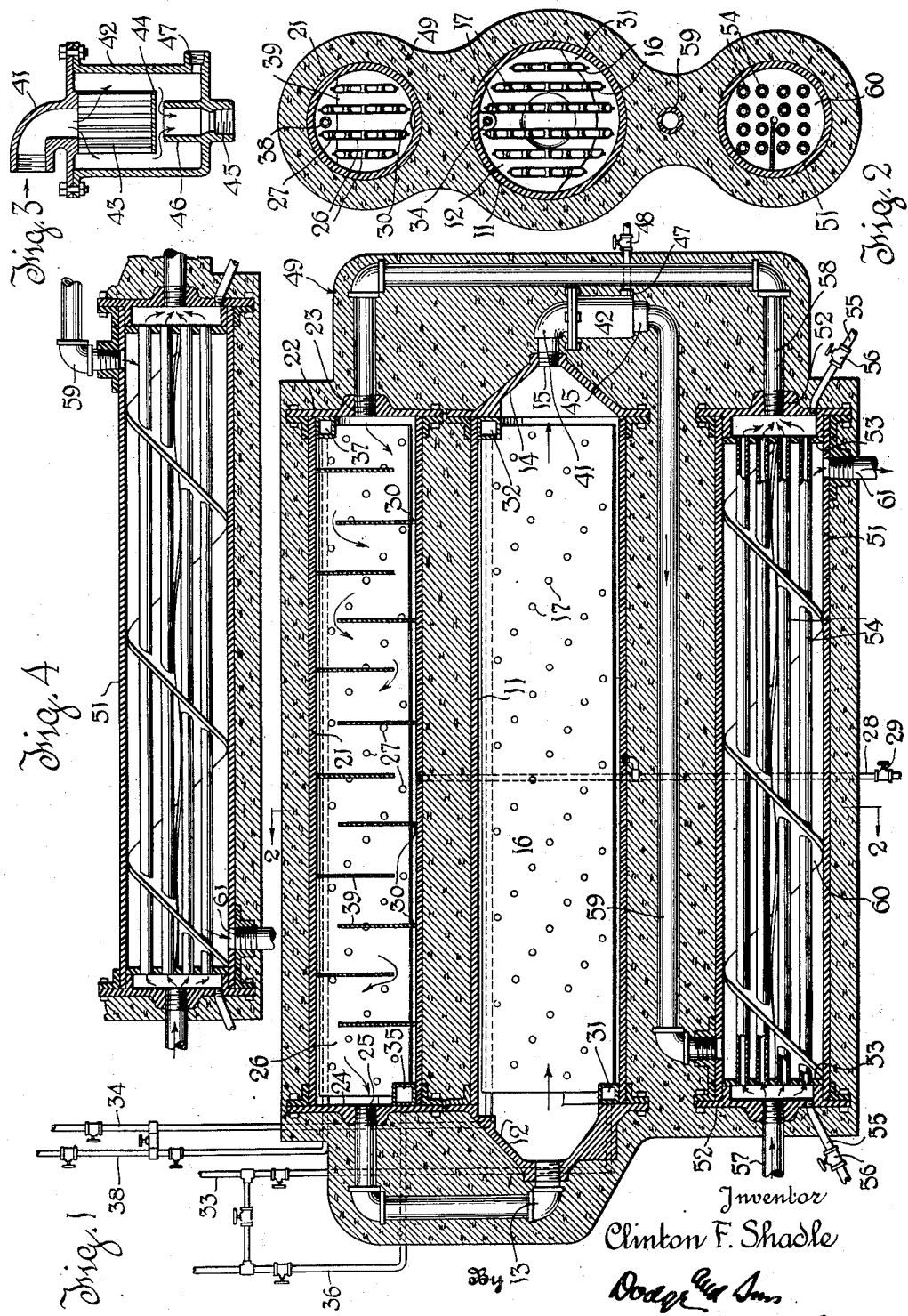
Inventor
Clinton F. Shadle
By Dodge and Sons
Attorneys Patented Apr. 12, 1932

1,853,236

UNITED STATES PATENT OFFICE

CLINTON F. SHADLE, OF WATERTOWN, NEW YORK

METHOD OF CONDITIONING AIR

Application filed April 1, 1930. Serial No. 440,810.

This invention relates to a method of drying gases, and particularly air, for industrial use. The apparatus forms the subject of a divisional application.

The invention has an extensive field of use in the treatment of compressed air. Compressed air is widely used in industry, and in many of the fields of use the presence of moisture in substantial quantity entails serious difficulty. For example, in spraying paint by the use of compressed air, serious harm can be done by water sprayed with the air. Unless the compressed air is freed of water, there is a tendency for condensed moisture to accumulate in the system, and when this has accumulated in quantity it may be picked up by the discharging air and become a source of loss and delay.

Compressed air motors are subject to frequent stoppage by frost when used with air not properly freed of moisture. Similarly, in air brakes of various types, the deposition of moisture throughout the system has been a frequent cause of trouble and expense. When atmospheric temperatures fall below the freezing point of water, the possibility that the moisture will freeze and impair or prevent the operation of the brakes, is a source of serious danger. Consequently, any apparatus which will reduce the moisture content of air to a low point, at a commercial rate, and without undue expense, is of substantial economic importance.

There are two physical principles which may be availed of to reduce the moisture content of gases. The total weight of water which will exist as vapor in a given volume is dependent upon vapor pressure which is a function of temperature. The presence or absence of a gas in the volume does not materially affect the weight of water which will exist as vapor, nor does the density of that gas have material effect. Hence, if saturated air, for example, be compressed and if its initial temperature be restored, it will reject moisture, for as the volume is reduced the amount of moisture which can exist at a given temperature is similarly reduced. If the volume and temperature both be reduced from the initial value, it is obvious that a given volume will contain an increasing weight of air and a decreasing weight of moisture, so that the ratio of moisture to air will diminish.

Attempts to avail of these principles on a commercial scale by the use of refrigerative conditioners have not, so far as I am advised, secured results which even approximate the theoretical possibilities. This is particularly true where efforts are made to reduce the absolute humidity to a very low value.

As the most important field for devices of the character here under discussion is in the dehumidification of air, reference will hereafter be made to air, but with the understanding that the same principles apply to the treatment of gases in general, and that the discussion is illustrative.

The present application is subordinate to my copending application Serial No. 440,809, filed April 1, 1930, and involves a particular embodiment of the principle upon which that application is based. The prior application above identified is directed to the use of refrigerative surfaces past which the air flows under conditions which minimize turbulence. In this way the heat transfer occurs primarily by radiation, and heat conduction is minimized. As a result of this action minute water droplets form in suspension in the air and grow at a rapidly increasing rate. Remaining in suspension they leave the device with the discharging air, and because they have been allowed to attain a sufficient size by growth they can be immediately eliminated by mechanical means.

The prior application contemplates the use of one or more stages in which non-turbulent flow is secured. The present application involves a variant in which the first refrigerative stage is maintained at such a temperature that frosting can not occur. Whether this temperature is exactly at or slightly above, or even slightly below the freezing point of water, has been the subject of some controversy and has not been accurately determined, but the essential thing is that the temperature be such in the first stage that frosting will not occur, and that in the first sage means are provided to give the air a violently turbulent flow and thus accentuate the heat transfer to the refrigerative surfaces. In this way the air is economically cooled and rapidly dried.

The second stage cooling has the non-turbulent flow characteristic. The second stage receives air with a low initial moisture content from the first stage, cools that air with a minimum amount of frost deposition, and delivers the air to a mechanical separator in condition for effective treatment by such separator.

In the drawings,—

Fig. 1 is a vertical axial section of the complete conditioner including an interchanger.

Fig. 2 is a section on the line 2—2 of Fig. 1.

Fig. 3 is a vertical axial section on an enlarged scale, showing the centrifugal moisture separator.

Fig. 4 is a fragmentary view showing modified connections to the interchanger.

The second stage refrigerative unit comprises a shell 11 having a head 12 of generally conical form at its entrance end with an inlet connection 13. At the exit end there is a conical head 14 with an outlet connection 15. Mounted in the shell are a plurality of parallel vertical leaves 16 which are stayed, as indicated at 17, against both expansive and compressive stresses.

In operation the pressure in the shell 11 is (for example) of the order of 150 pounds, while the suction pressure acting on the interior of the leaves 16 is quite low. When the whole plant is shut down the pressure in the drum or shell 11 may be atmospheric, while the pressure within the leaves 16 may be substantially higher. Consequently the stays must act in both directions.

The conical heads are used to produce a gradual change of section so that the air will enter and leave with a minimum turbulence, and the shell 11 is given a considerable cross section to reduce the velocity of flow to the point at which turbulence is minimized. This flow is made as slow as practicable dimensions of the device will permit. A reasonable value is 150 lineal feet per minute.

The first refrigerative stage includes a similar shell 21 with entrance head 22, inlet connection 23, exit head 24 and exit connection 25. There are a plurality of vertical refrigerative leaves or cells 26, similar to the parts 16, and similarly stayed at 27. There is a common drain connection 28 from the bottom of both shells to carry away any precipitated moisture, and this connection is controlled by any suitable valve means and represented by the hand operated valve 29.

Liquid volatile refrigerant is fed to the leaves 16 by a manifold 31 and evaporated refrigerant is withdrawn from the leaves by a manifold 32. A liquid line 33 feeds liquid to the manifold 31 and a suction line 34 is connected with the suction manifold 32. Similarly the leaves 26 are fed by a supply manifold 35 through a liquid line 36. The evaporated refrigerant is withdrawn through a suction manifold 37 and suction line 38.

There are a series of staggered baffles 39 in the shell 21 which give the air a pronounced turbulent flow. These baffles are notched out, as indicated at 30, to allow precipitated water to flow to the drain 28.

In use, air to be treated enters at 23, follows a zig-zag path through the shell 21, depositing such moisture as can be precipitated under the temperature conditions existing. This air thus partially dried then passes in substantially non-turbulent flow through the spaces between the leaves 16 and is discharged at 15 through an elbow 41 into a separator, indicated in Fig. 1 by the reference numeral 42 applied to its shell. The elbow 41 delivers into the center of a chamber defined by the circular series of secant blades 43 and by a horizontal baffle 44 which connects the lower ends of these blades. The air passing between the blades is given a whirling motion and deposits its moisture on the blades and on the interior of the shell 42. This moisture drains to the bottom of the shell and is kept from flowing to the discharge connection 45 by means of an annular baffle or dam 46 which underlies the baffle 44. The air flows over the baffle 46 and passes to the discharge connection 45. Moisture deposited in the shell 42 is drained away through the discharge connection 47. This, as indicated in Fig. 1, is controlled by any suitable valve 48.

The parts so far described are embedded in insulation 49 to prevent the inleakage of heat, so far as may be. In many cases the parts above described will constitute the entire apparatus, but in some instances it is desirable to raise the temperature of the outgoing air and recover some of the refrigerative effect by the use of a regenerative interchanger. This interchanger includes a shell 51 having heads 52 which are bolted in place and position two tube sheets 53 connected by a series of parallel tubes 54. There are drain connections 55 controlled by valves 56 for removing precipitated moisture from the space between the heads 52 and tube sheets 53. The air coming from the compressor, either directly or through an atmospheric cooler, enters at 57, flows through the tubes 54, and discharging at 58 passes to the inlet connection 23 of the shell 21. The air passes with turbulent flow through this shell, passes from the discharge connection 25 to the inlet connection 13 of the shell 11, flows through the shell 11 with non-turbulent flow, discharges through connection 15 to the separator 42, and leaving the separator through connection 45, flows by way of pipe 59 to the interior of shell 51. It then flows in contact with the interior of the tubes 54 to the discharge connection 61 which conducts the air to the point of use. In the latter flow through shell 51 the velocity is increased and turbulence is promoted by the spiral baffle 60.

The interchanger shell 51, as shown in Fig. 1, is connected for concurrent flow, that is, the two air currents within and without the tubes 54, both flow in the same general direction, that is, from left to right. Counterflow will give a greater heat interchange, and where freezing temperatures will not be reached in the interchanger, can be used. To secure countercurrent flow the connections 59 and 61 are reversed in position on the drum 51, as is indicated in Fig. 4.

The illustration given in the accompanying drawings is to a considerable extent diagrammatic, and various modifications of form and arrangement are contemplated.

In apparatus as actually used the air was compressed by a two stage direct acting air pump of the type commonly used in air brake installations, and was delivered by the pump under a pressure of the order of 150 pounds gage. The temperature at discharge approached 500° F. at times. The heat of compression was largely removed by passing the air through an atmospheric cooler composed of a pipe exposed to the surrounding air. This cooler delivered the air to the apparatus above described, and the dried air was delivered to the usual receiver, known in air brake practice as a main reservoir. Various different temperatures were maintained in the cooling units, particularly the second.

Strictly non-turbulent flow is difficult, if not impossible to attain, but low lineal velocities are essential, and as the velocity is lowered the desired condition is approached. For commercial use a lineal velocity of about 150 feet per minute, has been found practicable, and at such velocities satisfactory results have been secured.

What is claimed is:

1. The method of removing water from a mixture of water vapor and a gas, which consists in passing said mixture at a relatively high lineal velocity and with sudden changes of direction into contact with a refrigerating surface maintained at a temperature near the freezing point of water, but not low enough to cause the deposition of frost, and thereby causing the partial precipitation of moisture from the mixture, draining away said moisture, then bringing the partially dried gas into heat radiating relation with a refrigerated surface maintained substantially below the freezing point of water, with which surface the major portion of the mixture does not contact, and thereby causing the formation and growth of water droplets to a size capable of mechanical separation from the gas, and then mechanically separating such droplets from the gas.

2. The method of removing water from a mixture of water vapor and a gas, which consists in passing said mixture at a relatively high lineal velocity and with sudden changes of direction into contact with a refrigerating surface maintained at a temperature near the freezing point of water, but not low enough to cause the deposition of frost, and thereby causing the partial precipitation of moisture from the mixture, draining away said moisture, then bringing the partially dried gas into heat radiating relation with a refrigerated surface maintained substantially below the freezing point of water, with which surface the major portion of the mixture does not contact, and thereby causing the formation and growth of water droplets to a size capable of mechanical separation from the gas, and then giving the gas with the suspended droplets a whirling motion whereby the droplets are separated from the gas by centrifugal force.

3. The method of removing water from a mixture of water vapor and a gas, which consists in passing said mixture at a relatively high lineal velocity and with sudden changes of direction into contact with a refrigerating surface maintained at a temperature near the freezing point of water, but not low enough to cause the deposition of frost, and thereby causing the partial precipitation of moisture from the mixture, draining away said moisture, then causing the partially dried gas to assume a substantially non-tubulent flow past a surface maintained at a temperature below the freezing temperature of water and thereby forming suspended water droplets and causing the same to grow until large enough to permit separation from the gas by inertia effects, and then separating such suspended droplets from the gas by inertia effects.

4. The method of removing water from a mixture of water vapor and a gas, which consists in passing said mixture at a relatively high lineal velocity and with sudden changes of direction into contact with a refrigerating surface maintained at a temperature near the freezing point of water, but not low enough to cause the deposition of frost, and thereby causing the partial precipitation of moisture from the mixture, draining away said moisture, then causing the partially dried gas to assume a substantially non-turbulent flow past a surface maintained at a temperature below the freezing temperature of water and thereby forming suspended water droplets and causing the same to grow until large enough to permit separation from the gas by inertia effects, and then imparting a whirling motion to said gas and suspended droplets and causing the separation of the droplets from the gas by centrifugal force.

5. The method defined in claim 1, in which untreated mixture flowing toward the point of treatment and dried gas after treatment are passed in heat exchanging relation but out of contact with each other, whereby the dried gas is partially heated and the untreated mixture is cooled.

In testimony whereof I have signed my name to this specification.

CLINTON F. SHADLE.